July 16, 1968 R. T. BUSTOS 3,393,273

TELEPHONE ENCLOSURE

Filed Oct. 14, 1964 3 Sheets-Sheet 1

INVENTOR.

RAFAEL T. BUSTOS

BY

Browne, Schuyler & Beveridge

ATTORNEYS

July 16, 1968 R. T. BUSTOS 3,393,273

TELEPHONE ENCLOSURE

Filed Oct. 14, 1964 3 Sheets-Sheet 2

INVENTOR.
RAFAEL T. BUSTOS

BY

Browne, Schuyler & Beveridge
ATTORNEYS

July 16, 1968 R. T. BUSTOS 3,393,273

TELEPHONE ENCLOSURE

Filed Oct. 14, 1964 3 Sheets-Sheet 3

INVENTOR.
RAFAEL T. BUSTOS

By Browne, Schuyler & Beveridge
ATTORNEYS

United States Patent Office 3,393,273
Patented July 16, 1968

3,393,273

TELEPHONE ENCLOSURE

Rafael T. Bustos, Atlanta, Ga., assignor to Gladwin Plastics, Inc., Atlanta, Ga., a corporation of Georgia Filed Oct. 14, 1964, Ser. No. 403,854
4 Claims. (Cl. 179—6.3)

ABSTRACT OF THE DISCLOSURE

An enclosure for housing a coin telephone while at the same time permitting the telephone to be operated externally of the enclosure. A holder for the handset is mounted to the external part of the enclosure and connected to the handset hook so that, when the handset is received on the holder, the handset hook will be depressed to de-energize the telephone and, when the handset is removed from the holder, the handset hook will be released to energize the telephone. To permit access to the telephone, the front wall of the enclosure is removable and a key operated lock is provided to secure the front wall in closed position against theft. The front wall of the enclosure is made in two parts, only one of which need be removed for coin collection.

This invention relates to enclosures and, more particularly, to a novel enclosure for housing a coin telephone.

Modernizing the appearance of public telephones by conventional techniques is costly since it often necessitates new telephone equipment as well as susbtantial modification of the original telephone structure. In some instances, a completely new telephone is required in order to effect such modernization. Moreover, as a result of certain conventional modernization methods, operable telephone apparatus is often completely discarded because it cannot be incorporated into the modernized structure.

It is therefore an object of the present invention to provide an enclosure whereby the external appearance of a coin telephone may be enhanced or modernized with virtually no modification of the original telephone structure and without altering normal operation of the telephone.

A further object of the present invention is to provide a telephone enclosure that will provide added security against theft of the coins deposited in the telephone as well as damage to the telephone apparatus often incident to such theft.

Another object of the present invention is to provide such a telephone enclosure which permits convenient access to the telephone for maintenance or coin collection and which may be locked against unauthorized access simply by means of a key.

A still further object of the present invention is to provide such a telephone enclosure that may be economically manufactured with a highly durable construction and easily applied to a telephone even at an installational site thereof. Included herein is a provision of such a telephone enclosure that may be employed to additionally house the telephone "bell box" which heretofore has been located apart from the telephone.

The foregoing objects are achieved by a generally box-like enclosure dimensioned to receive a telephone and an associated "bell box" with the handset cord being passed through an aperture in the enclosure so as to locate the handset externally of the enclosure. Any desired derivative appearance may be imparted to the enclosure and in the illustrated embodiment, provision is made for decorative side panels which may be conveniently replaced to change the appearance of the enclosure.

For supporting the handset, a holder is pivotally mounted to the front wall of the enclosure, and a linkage connects the holder and the handset hook of the telephone so that when the handset is placed on the holder the hook of the telephone will be depressed and the telephone de-energized, and when the handset is removed from the holder of the hook of the telephone will be released to energize the telephone.

Access to the station selecting mechanism of the telephone is provided by an aperture in the front wall of the enclosure. With telephones of the coin type such as that illustrated, the front wall is additionally apertured so as to afford access to the coin insert slots and return receptacle of the telephone. Additionally, an arm for actuating the coin release plunger of the telephone is pivotally mounted to the front wall of the enclosure in overlying relationship with the coin release plunger.

For installation, maintenance and coin collection, the front wall of the enclosure is removable, and to lock the front wall so as to secure the enclosure against theft, a novel lock mechanism is provided. This lock mechanism is readily operable through means of a key.

Other objects and features of the present invention will become apparent by reference to the specification and appended claims together with the attached drawings in which:

Figures 1, 3, 5, 6:
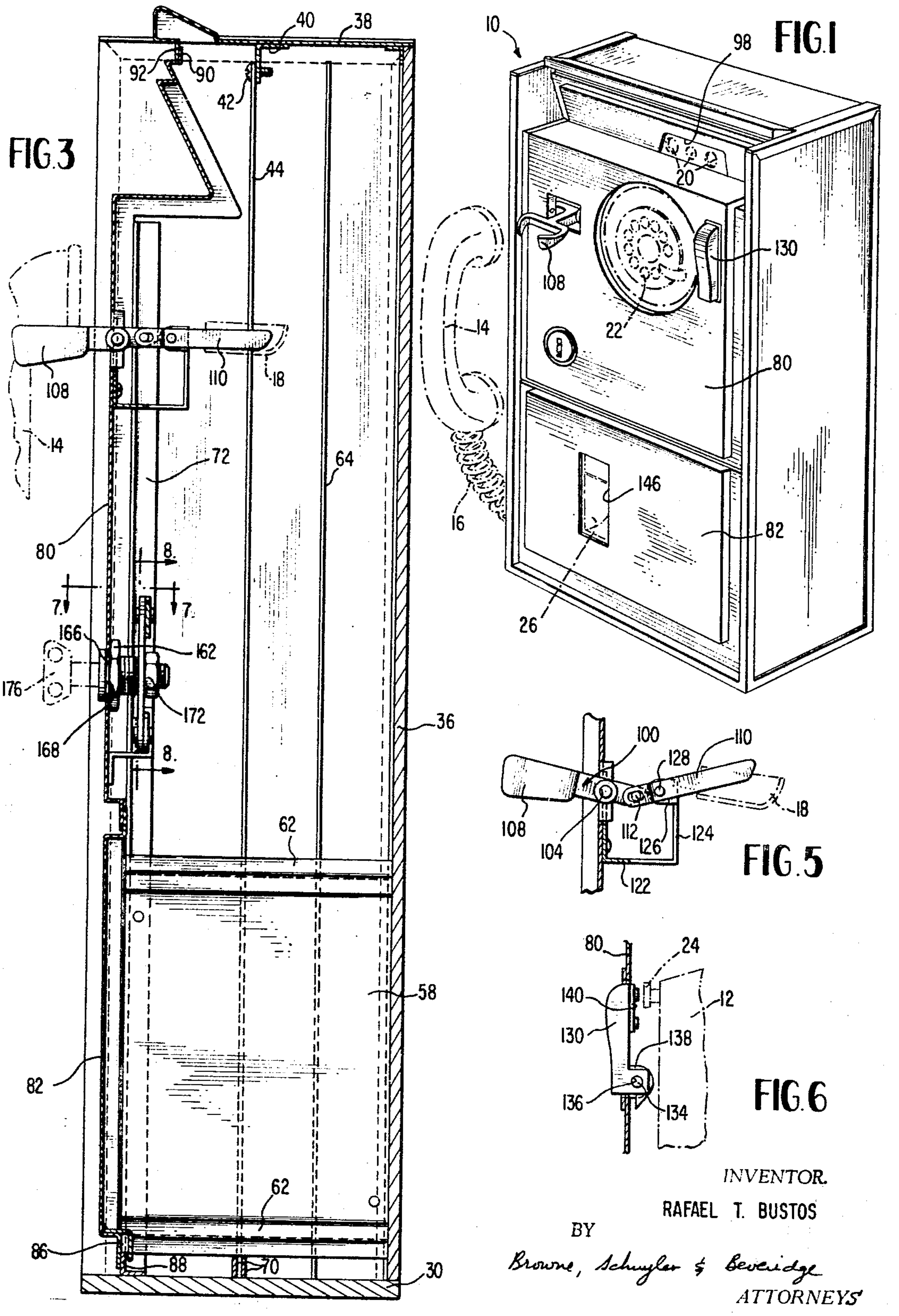
FIG. 1 is a perspective view of a telephone enclosure, embodying the present invention, installed on a coin telephone, portions of which are shown in phantom.
FIG. 3 is an enlarged longitudinal cross-sectional view of the telephone enclosure, with a lock key and portions of the telephone shown in phantom.
FIG. 5 is a fragmentary cross-sectional view showing a handset holder of the enclosure, and an associated handset hook of the telephone in phantom.
FIG. 6 is a fragmentary cross-sectional view taken longitudinally through the front wall of the enclosure showing an arm for actuating a coin release plunger illustrated in phantom.
Figure 2:
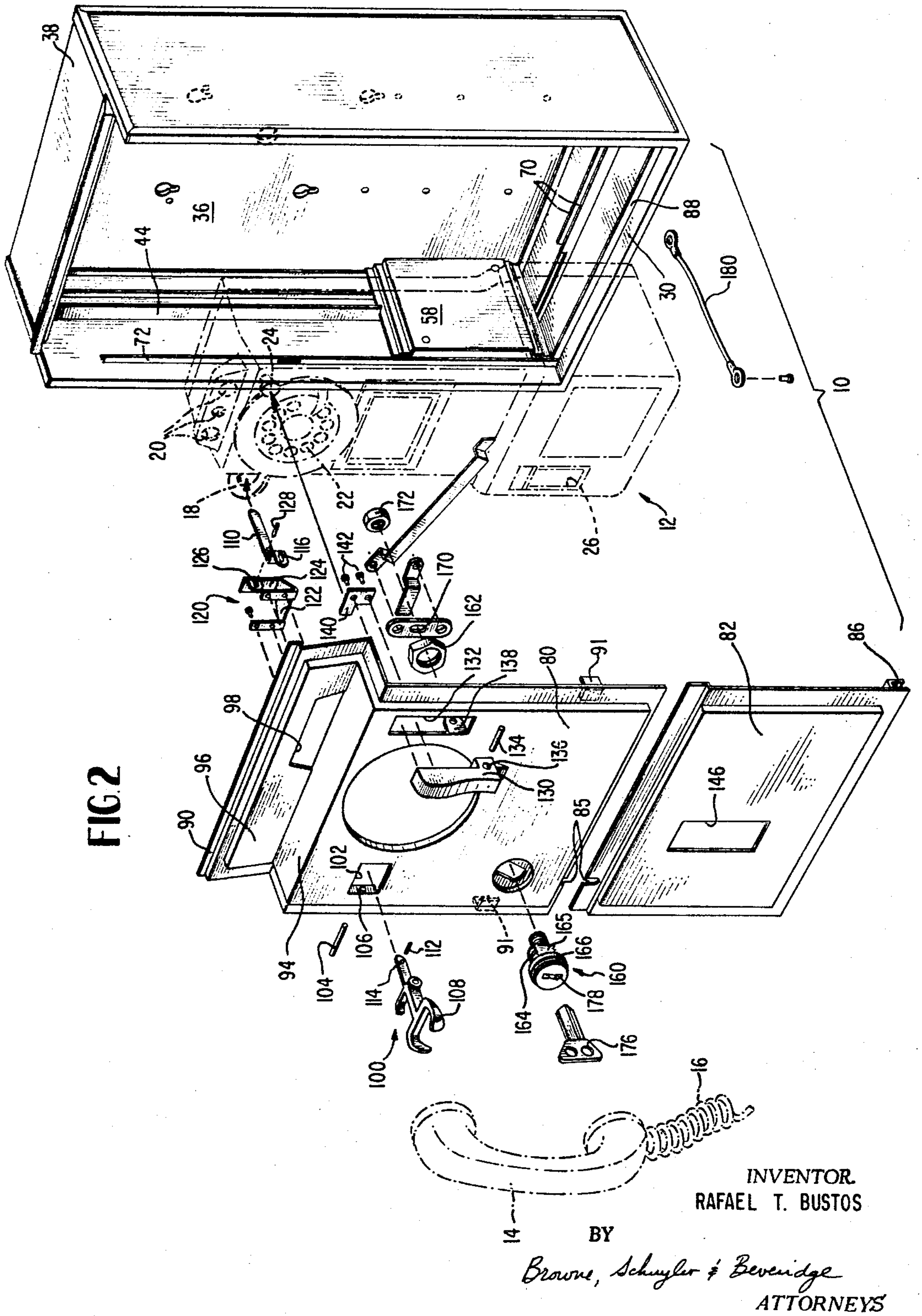
FIG. 2 is an exploded perspective view of the telephone enclosure of FIG. 1 and additionally showing a lock key.

Referring to the drawings in detail, FIGS. 1 and 2 illustrate an enclosure generally designated 10, embodying the present invention, employed to house a telephone 12 of the conventional coin type including a handset 14 operated through a cord 16 which also attaches the handset 14 to the telephone for movement between an idle position where it rests on a typical handset hook 18 and an operable position wherein it is removed from the handset. The illustrated telephone 12 is provided with the usual coin insert slots 20, a rotatable dial 22 for selecting the station to be telephoned, a coin release plunger 24 for returning the deposited coin, and a receptacle 26 for receiving returned coins.

Figures 4, 7:
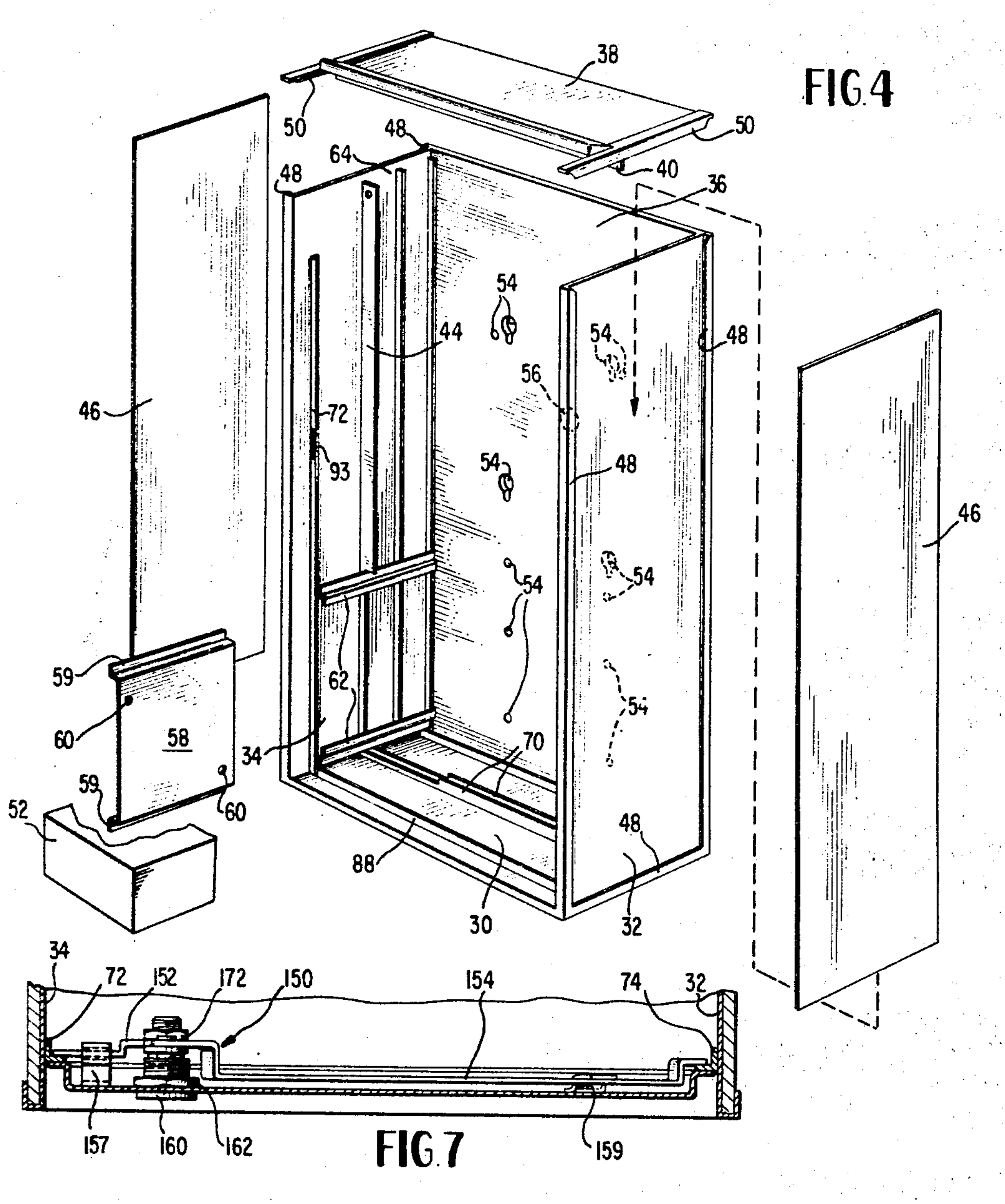
FIG. 4 is an exploded perspective view of portions of the telephone enclosure together with a "bell box"
FIG. 7 is a fragmental enlarged cross-sectional view taken generally along lines 7—7 of FIG. 3.

Referring to FIG. 4, the illustrated enclosure 10 is comprised of a generally box-like body including a base or bottom wall 30, a pair of parallel side walls 32, 34 upstanding from base 30, a back wall 36 located between side walls 32, 34 and upstanding from base 30, and a top wall 38 extending across the upper ends of the side walls in parallel relation to the base. The enclosure walls may be formed from any suitable hard-wearing panels such as of plastic or metal suitably joined together such as by welding or bonding. However, in the shown embodiment (see FIG. 3), top wall 38 is additionally secured to side walls 32, 34 by means of a flange 40 depending from top wall 38 and fastened such as by screws 42 to a pair of elongated ribs 44 fixed longitudinally on the inner surface of side walls 32, 34 respectively.

In the preferred embodiment, provision is made for removably mounting decorative panels 46 to side walls 32, 34 so as to permit the appearance of the side walls to be conveniently altered subsequent to the initial installation of the enclosure. This is accomplished by elongated flanges 48 of L-shaped cross-section integrally formed along the side and bottom edges of said walls 32, 34 for receiving panels 46 in the manner illustrated in FIG. 4. Panels 46 are maintained in flanges 48 against longitudinal movement by flanges 50 integrally formed at the ends of top wall 38 so as to project downwardly over the upper ends of panels 46. Top wall flanges 50 are dimensioned similar to side wall flanges 48 to complete a uniform rectangular pattern about the margin of side walls 32, 34 for ornamental purposes.

Enclosure 10 is dimensioned so that the space which it encloses is sufficient to receive telephone 12 in the right hand side (as viewed in FIG. 2) of the enclosure and so as to leave a space to the left of the telephone for receiving box 52 commonly referred to as the "bell box" which contains a ringer mechanism and associated equipment. Securement of the telephone in the enclosure and mounting of the enclosure to a wall of a telephone booth or the like is accomplished through slots and holes 54 in back wall 36. Aperture 56 is additionally provided in back wall 36 to permit various electrical wires from the telephone to be passed outwardly of the enclosure for connection to the usual power source.

Referring to FIG. 4, a bracket 58 having bell box mounting apertures 60 is provided to secure bell box 52 in the enclosure. Bracket 58 is fixed to the inner surface of side wall 34 at the lower end thereof by means of a pair of channel strips 62 which are attached transversely across side wall 34 so as to slideably receive the opposite sides 59 of bracket 58 as illustrated in FIG. 4; opposite sides 59 of bracket 58 being shaped for insertion in and retention by channel strips 62. Rib 44 employed to secure top wall 38 is recessed at the lower end thereof to accommodate bracket 58; and additionally provided is an elongated rib 64 fixed longitudinally on the inner surface of side wall 34 for supporting channel strips 62 in parallel relationship to side wall 34 as well as adding dimensional stability to side wall 34. If desired, base 30 may also be provided with a pair of strengthening ribs 70 which additionally serve to space the telephone from the base.

In accordance with the invention the enclosure is completed by a removable front wall illustrated as being formed by upper and lower panels 80, 82 dimensioned to be received between side walls 32, 34 and against a pair of elongated ribs 72, 74 which are fixed to the inner surface of side walls 32, 34 in recessed and parallel relationship to the longitudinal front edges thereof. Referring to FIG. 3, in the assembled position, front wall panels 80, 82 abut against ribs 72, 74 with the upper portion of lower panel 82 received behind the lower portion of upper panel 80. Additionally, lower panel 82 is provided at its bottom edge with a U-shape channel 86 which receives a longitudinal rib 88 fixed on the inner surface of base 30 in the same plane as ribs 72, 74 while upper panel 80 is formed with an upstanding flange 90 received behind a depending flange 92 formed on top wall 38 as shown in FIG. 3. Front wall panels 80, 82 are locked in this assembled position by means of a lock mechanism generally designated 150 to be subsequently described in detail. In the preferred embodiment, upper front wall panel 80 is provided on its opposite sides with locking spurs shown (see FIGS. 2 and 3) as L-shaped members 91 which are receivable in corresponding slots 93 formed in ribs 72 so as to prevent outward bowing of side walls 32, 34 such as might occur in an attempted theft of the telephone.

As exemplified by the illustrated embodiment, front wall panels 80, 82 may be manufactured with a desired ornamental appearance and where the telephone to be housed is of the type having coin insert slots 20 as shown in the drawings, upper panel 80 is formed with a recessed ledge 94 and an inclined portion 96 projecting outwardly from ledge 94 so as to closely overlie the coin insert slots 20. Access to coin insert slots 20 is provided by an elongated slot 98 formed in inclined portion 96 of upper panel 80 to be registrable with coin insert slots 20 when front panel 80 is assembled.

Handset cord 16 is received through slots 85 (see FIG. 2) formed in the lower and upper edges of front panels 80, 82 and a holder or auxiliary handset hook 100 is provided to support handset 14 in its idle position and as well as to operate handset hook 18 of the telephone in response to movement of handset 14 on and off the holder 100. As best shown in FIG. 2, holder 100 extends through an aperture 102 formed in upper panel 80 where it is mounted for pivotable movement between upper and lower positions by a pivot pin 104 received through an intermediate portion of holder 100 and fixed in a pair of tabs 106 projecting rearwardly from the inner surface of upper panel 80 on opposite sides of aperture 102. Formed at the front of holder 100 is a cradle 108 dimensioned to receive handset 14 in the usual manner.

Referring to FIGS. 2, 3 and 5, movement of holder 100 is transmitted to handset hook 18 of the telephone by means of a lever 110 having one end portion engageable on handset hook 18 and having its opposite end pivotally connected to the rear end of holder 100 by a pin 112 received through apertures 114 and 116 in the holder and lever respectively. Aperture 116 in lever 110 is elongated and thus provides a lost motion connection between holder 100 and lever 110 permitting the desired pivotal movement of these elements.

Referring to FIGS. 2 and 5, mounting lever 110 for pivotal movement is a bracket 120 fixed to panel 80 behind aperture 102 and projecting rearwardly at 122 then upwardly at 124 and terminating in an apertured mounting tab 126. A pivot pin 128 is received through an intermediate portion of lever 110 and secured in mounting tab 126 to complete the assembly.

Thus it will be seen that when handset 14 is removed from cradle 108 as shown in FIG. 5, handset hook 18 of the telephone will move to its raised position under the action of its associated biasing mechanism (not shown) thereby pivoting lever 110 counter-clockwise (as viewed in FIG. 5) which in turn will pivot holder 100 clockwise to its upper position. When handset 14 is returned to cradle 108 holder 100 will pivot counter-clockwise and will cause lever 110 to pivot clockwise to thus depress handset hook 18 to its lower position where it causes deenergization of the telephone in the normal manner.

When employed with telephones that have a coin release plunger such as plunger 24, the enclosure is provided with an actuating arm 130 overlying plunger 24 for operating the same. In the illustrated form, arm 130 is pivotally mounted in an aperture 132 in upper panel 80 by means of a pin 134 received through aperture 136 in the lower portion of actuating arm 130 with its ends fixed in a pair of mounting ears 138 projecting rearwardly from the inner surface of the upper panel on opposite sides of aperture 132. Depression of actuating arm 130 moves plunger 24 inwardly to release a coin and return of actuating arm 130 is achieved by return of plunger 24 under its associated biasing mechanism (not shown). Return or outward movement of actuating arm 130 is limited in the shown embodiment by a plate 140 secured such as by screws 142 to arm 130 to be engageable with the inner surface of upper panel 80 in limiting movement.

Coins which have been returned to receptacle 26 of the telephone may be removed through a rectangular aperture 146 formed in the lower front wall panel 82 in registry with coin return receptacle 26.

In accordance with another aspect of the invention, lock mechanism 150 provided for securing front wall panels 80, 82 in assembled position, includes first and second locking levers 152 and 154 movable generally laterally of the enclosure between a locking position (shown in FIGS. 7 and 8) where they are engaged behind ribs 72 and 74 respectively and an unlocking position where they are retracted or spaced inwardly from ribs 72, 74. Locking levers 152, 154 are guided in their movement between locking and unlocking positions by a pair of clips 157, 159 fixed to the inner surface of upper panel 80 where they slideably receive the locking levers as shown in FIGS. 7 and 8.

Actuation of locking levers 152, 154 is obtained by means including a rotary link 156 having its opposite ends pivotally connected by pins 158 to the inner ends of locking levers 152, 154. Rotation of link 156 to actuate levers 152, 154 is achieved through a plug 160 rotatably mounted in a circular hole in upper panel 80 by means of a lock nut 162 threadedly received on a threaded intermediate portion 164 of plug 160 so as to be engageable with the internal surface of upper panel 80 as shown in FIG. 3. Formed on the front end of plug 160 is an annular recess 166 defining a shoulder 168 engageable against the external face of front panel 80, which shoulder 168 together with lock nut 162 serves to fix plug 160 in the front panel against axial movement while permitting plug 160 to undergo rotational movement.

Figure 8:
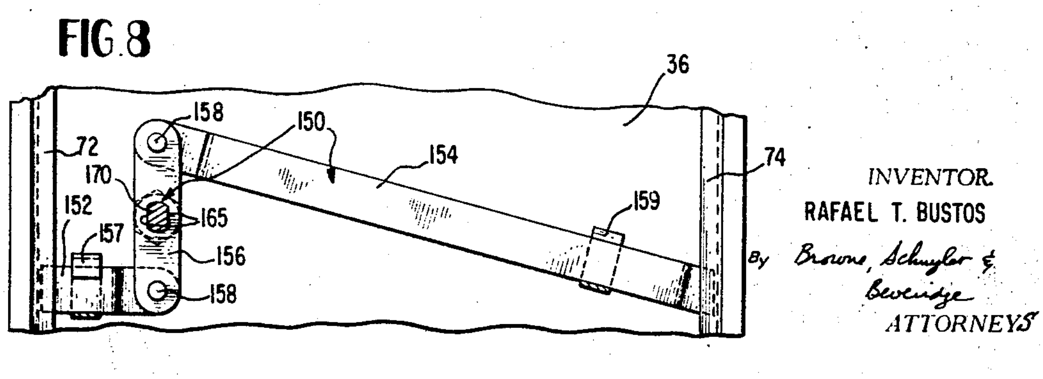
FIG. 8 is a fragmental enlarged cross-sectional view taken generally along lines 8—8 of FIG. 3.

Rotary motion of plug 160 is transmitted to link 156 by reception of the intermediate portion of plug 160 in an elongated slot 170 formed in link 156; there being flats 165 formed on the intermediate portion of the plug and engageable with the edges of slot 170 as shown in FIG. 8 to preclude lost motion between link 156 and plug 160. Link 156 is secured on plug 160 by a lock nut 172 received on the inner end of plug 160 which is reduced in diameter and correspondingly threaded.

Rotation of plug 160 to operate locking levers between their locking and unlocking positions is conveniently obtained by a key 176 insertable in a passage 178 formed, complementary to the key, in plug 160.

Assuming that the telephone and associated bell box have been placed into the enclosure in their respective positions, front panels 80, 82 are assembled by placing lower panel 82 against ribs 76, 74 with its lower channel 86 receiving base cross-rib 88. Handset 14 is then placed externally of the enclosure by passing handset cord 16 through slot 85 in lower panel 82. With locking levers 152, 154 in their retracted positions, upper flange 90 of upper panel 80 is then placed behind depending flange 92 of top wall 38 and then the upper panel is pivoted inwardly until it engages longitudinal ribs 72, 74 with the lower portion of upper panel 80 engaged against the upper portion of lower panel 82 and with locking spurs 91 received through slots 93. Key 176 is then inserted in plug 160 and rotated clockwise (as viewed in FIG. 2) to engage locking levers 152, 154 behind ribs 72, 74 to thereby lock the front panels in place.

Access to the telephone such as for coin collection may be accomplished by removing the lower panel 82 and in this regard a cable 180 (see FIG. 2) may be attached to lower panel 82 and base 30 so as to preclude misplacement of the lower panel when it is so removed.

As will be apparent to persons skilled in the art, various modifications and adaptations of the structure above described will become readily apparent without departure from the spirit and scope of the invention which is defined in the appended claims.

What is claimed is:

1. For use as an outer housing for a telephone of the type having a handset and a hook for supporting the handset and controlling energization of the telephone; an enclosure comprising a plurality of walls defining a substantially closed chamber dimensioned to receive a telephone, holding means for supporting the handset of the telephone to be received in the chamber, means mounting said holding means to one of said walls for movement between a first position wherein the handset is received on said holding means and a second position wherein the handset is removed from said holding means, linkage means connected to said holding means adapted to be cooperable with the handset hook of the telephone to be received in the chamber to depress the handset hook when said holding means is in said first position and to release the handset hook to energize the telephone when said holding means is moved from said first position to said second position, said means mounting said holding means to one of said walls including a pivot, said linkage means including a lever pivotally mounted intermediate the ends thereof, one end of said lever being pivotally connected to one end of said holding means and the other end of said lever adapted to rest on the handset hook of the telephone to be received in the chamber.

2. The enclosure as defined in claim 1 wherein said mounting means further includes a bracket fixed to the inner surface of said one wall, said pivot is supported in said bracket and is received through an intermediate portion of said holding means, and said lever is pivotally mounted intermediate the ends thereof by means of a pivot received through said bracket.

3. An enclosure for housing a telephone comprising in combination, top and bottom walls, a pair of side walls, a back wall, and upper and lower front walls secured together to form a chamber dimensioned to receive a telephone, a holder for supporting a handset of a telephone to be received in the chamber and means mounting said holder to said upper front wall, an upstanding flange affixed to the bottom wall and extending between the side walls, said lower front wall having a bottom channel received over said upstanding flange with the upper portion of said lower front wall received behind the lower portion of said upper front wall, a pair of elongated ribs fixed to the internal sides of said side walls and extending generally between said top and bottom walls with said upper and lower front walls engaged against said ribs, and lock means releasably securing said upper front wall against said ribs.

4. The enclosure defined in claim 3 wherein said top wall has a depending flange, said upper front wall has an upper portion received behind said depending flange and further has a pair of locking spurs projecting rearwardly into the enclosure, and wherein said elongated ribs have apertures respectively receiving said locking spurs.

References Cited

UNITED STATES PATENTS

| | | | |
|---|---|---|---|
| D. 183,985 | 11/1958 | Hose | 179—6.3 |
| 2,371,968 | 3/1945 | Lum | 179—6.3 |
| 3,148,246 | 9/1964 | Hannula | 179—6.3 |
| 3,213,210 | 10/1965 | Samples | 179—6.3 |
| 3,258,535 | 1/1966 | Nawman | 179—6.3 |

KATHLEEN H. CLAFFY, *Primary Examiner.*

H. ZELLER, *Assistant Examiner.*